United States Patent
Doh et al.

(10) Patent No.: US 10,513,813 B2
(45) Date of Patent: Dec. 24, 2019

(54) LAUNDRY TREATING MACHINE

(71) Applicant: LG ELECTRONICS INC., Seoul (KR)

(72) Inventors: Youngjin Doh, Changwon-si (KR); Jihong Lee, Changwon-si (KR); Hong Namgoong, Changwon-si (KR); Kyuhwan Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 15/333,376

(22) Filed: Oct. 25, 2016

(65) Prior Publication Data

US 2017/0044702 A1    Feb. 16, 2017

Related U.S. Application Data

(63) Continuation of application No. 13/857,306, filed on Apr. 5, 2013, now Pat. No. 9,797,080.

(30) Foreign Application Priority Data

Apr. 6, 2012 (KR) .................. 10-2012-0036082
Apr. 6, 2012 (KR) .................. 10-2012-0036083

(51) Int. Cl.
    *D06F 39/08*     (2006.01)
    *D06F 25/00*     (2006.01)
    (Continued)

(52) U.S. Cl.
    CPC ....... *D06F 35/005* (2013.01); *B01D 46/0082* (2013.01); *D06F 25/00* (2013.01);
    (Continued)

(58) Field of Classification Search
    CPC ........ D06F 25/00; D06F 39/088; D06F 58/22; D06F 58/24
    See application file for complete search history.

(56) References Cited

U.S. PATENT DOCUMENTS 2,697,341 A    12/1954   Thomas
2,792,640 A    5/1957   Patterson
(Continued)

FOREIGN PATENT DOCUMENTS

CN      1375594      10/2002
CN      1464092      12/2003
(Continued)

OTHER PUBLICATIONS

U.S. Office Action dated Jun. 8, 2017 issued in co-pending U.S. Appl. No. 15/399,903.
(Continued)

*Primary Examiner* — Marc Lorenzi
(74) *Attorney, Agent, or Firm* — KED & Associates, LLP

(57) ABSTRACT

A laundry treating machine is provided. The laundry treating machine may include a tub to receive wash water, a drum rotatably provided in the tub, an air supply device to supply air to the tub, a lint filter to filter lint from the air circulated by the air supply device, a filter cleaning device to supply cleaning water to the lint filter to remove the lint from the lint filter, and a cooling water supply device to supply cooling water to an inner surface of the tub such that moisture contained in air is condensed at the inner surface of the tub.

6 Claims, 13 Drawing Sheets

(51) Int. Cl.
  *D06F 35/00* (2006.01)
  *D06F 58/22* (2006.01)
  *D06F 58/24* (2006.01)
  *B01D 46/00* (2006.01)
  *D06F 37/04* (2006.01)
  *D06F 39/04* (2006.01)
  *D06F 33/02* (2006.01)
  *D06F 39/02* (2006.01)
  *D06F 33/00* (2006.01)
  *D06F 37/22* (2006.01)

(52) U.S. Cl.
  CPC .............. *D06F 33/00* (2013.01); *D06F 33/02* (2013.01); *D06F 37/04* (2013.01); *D06F 37/22* (2013.01); *D06F 39/022* (2013.01); *D06F 39/04* (2013.01); *D06F 39/088* (2013.01); *D06F 58/22* (2013.01); *D06F 58/24* (2013.01); *B01D 2201/081* (2013.01); *B01D 2201/084* (2013.01); *D06F 2220/00* (2013.01)

(56) References Cited

U.S. PATENT DOCUMENTS

| | | | |
|---|---|---|---|
| 2,925,663 | A | 2/1960 | Smith |
| 3,805,404 | A | 4/1974 | Gould |
| 4,154,003 | A | 5/1979 | Muller |
| 6,205,603 | B1 * | 3/2001 | Vande Haar ............ D06F 37/22 68/23.2 |
| 8,438,750 | B2 | 5/2013 | Dittmer |
| 2004/0221474 | A1 | 11/2004 | Slutsky et al. |
| 2005/0132757 | A1 * | 6/2005 | Lee ........................ D06F 25/00 68/15 |
| 2005/0223504 | A1 | 10/2005 | Lee et al. |
| 2006/0101587 | A1 | 5/2006 | Hong |
| 2007/0033970 | A1 | 2/2007 | Lee et al. |
| 2008/0099052 | A1 | 5/2008 | Lee et al. |
| 2008/0196268 | A1 | 8/2008 | Jung et al. |
| 2009/0266388 | A1 | 10/2009 | Legault |
| 2010/0154240 | A1 | 6/2010 | Grunert |
| 2010/0192398 | A1 | 8/2010 | Ahn et al. |
| 2010/0251784 | A1 | 10/2010 | Lee et al. |
| 2011/0277336 | A1 | 11/2011 | Shin et al. |

FOREIGN PATENT DOCUMENTS

| | | |
|---|---|---|
| CN | 2685376 | 3/2005 |
| CN | 1702225 | 11/2005 |
| CN | 1786328 | 6/2006 |
| CN | 1844548 | 10/2006 |
| CN | 101153443 | 4/2008 |
| CN | 101343826 | 1/2009 |
| DE | 25 03 576 | 8/1976 |
| DE | 3738031 | 5/1989 |
| EP | 1 688 531 | 8/2006 |
| EP | 2 039 819 | 3/2009 |
| EP | 2 386 679 | 11/2011 |
| EP | 2 471 998 | 7/2012 |
| FR | 1 143 191 | 9/1957 |
| JP | 2004-261324 | 9/2004 |
| JP | 2004-305295 | 11/2004 |
| JP | 2006187449 | 7/2006 |
| JP | 2007-37890 | 2/2007 |
| JP | 2009-142351 | 7/2009 |
| JP | 4307105 | 8/2009 |
| JP | 2009-213799 | 9/2009 |
| KR | 10-2006-0008465 | 1/2006 |
| KR | 10-2006-0065266 | 6/2006 |
| KR | 10-0657474 | 12/2006 |
| KR | 10-2010-0091065 | 8/2010 |
| KR | 10-2010-0094687 | 8/2010 |
| KR | 10-2010-0129151 | 12/2010 |
| KR | 10-2010-0129242 | 12/2010 |
| KR | 10-2011-0125390 | 11/2011 |
| KR | 10-2012-0115435 | 10/2012 |
| NL | 7 607 113 | 1/1977 |
| WO | WO 2009/015919 | 2/2009 |
| WO | WO 2010/137910 | 12/2010 |
| WO | WO 2012/053746 | 4/2012 |
| WO | WO 2012/138136 | 10/2012 |
| WO | WO 2013/129779 | 9/2013 |

OTHER PUBLICATIONS

U.S. Notice of Allowance dated Jul. 28, 2017 issued in co-pending U.S. Appl. No. 13/857,306.
International Search Report dated Sep. 30, 2013 issued in Application No. PCT/KR2013/002798.
Korean Notice of Allowance dated Aug. 27, 2014 issued in Application No. 10-2012-0036082 (Original Notice of Allowance and English Translation).
Korean Notice of Allowance dated Oct. 29, 2014 issued in Application No. 10-2014-0028411 (with English translation).
Korean Notice of Allowance dated Jan. 29, 2015 issued in Application No. 10-2012-0036083 (with English Translation).
Australian Office Action dated Mar. 5, 2015 issued in Application No. 2013244150.
Chinese Office Action dated Jul. 3, 2015 issued in Application No. 201380002992.5.
Chinese Office Action dated Aug. 5, 2015 issued in Application No. 201410150641.5 (Original Office Action with English Translation).
Chinese Office Action dated Sep. 6, 2015 issued in Application No. 201410185985.X (with English Translation).
Russian Office Action dated Nov. 25, 2015 issued in Application No. 2014111800 (with English translation).
European Search Report dated Dec. 16, 2015 issued in Application No. 13772774.9.
Chinese Office Action dated Feb. 3, 2016 issued in Application No. 201380002992.5 (with English translation).
U.S. Office Action dated May 31, 2016 issued in U.S. Appl. No. 13/857,306.
U.S. Final Office Action dated Sep. 26, 2016 issued in U.S. Appl. No. 13/857,306.
European Search Report dated Apr. 24, 2017 issued in Application No. 16204711.2.
U.S. Office Action dated Jan. 27, 2017 issued in co-pending U.S. Appl. No. 13/857,306.
U.S. Final Office Action dated May 14, 2018 issued in co-pending U.S. Appl. No. 15/333,498.

* cited by examiner

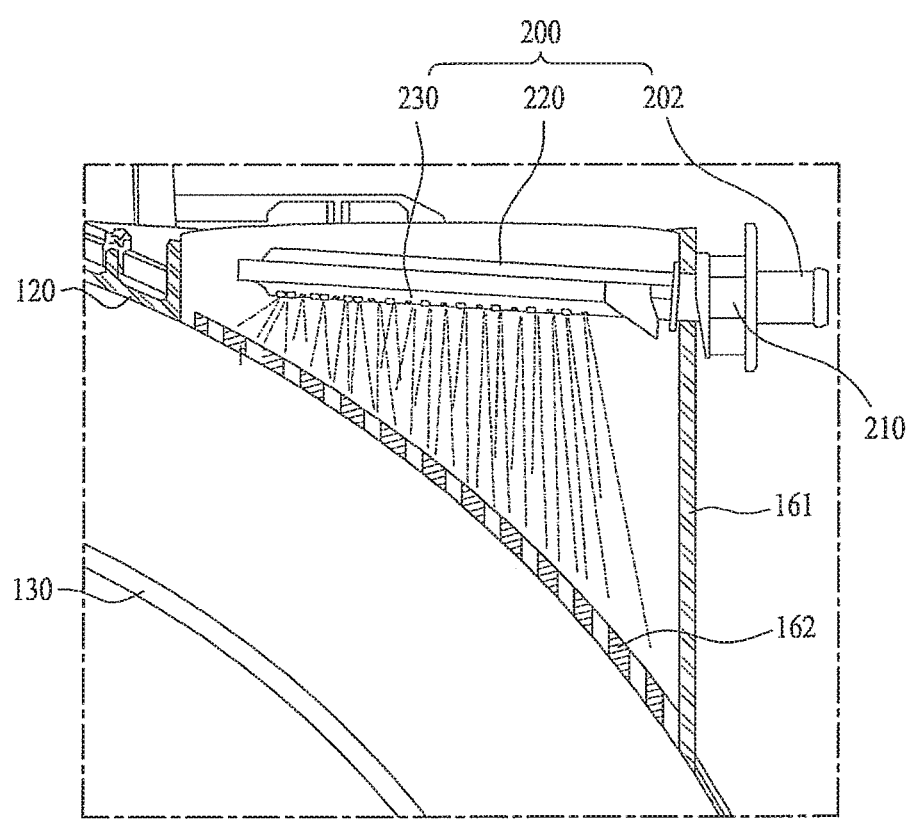

LAUNDRY TREATING MACHINE

CROSS-REFERENCE TO RELATED APPLICATIONS

This application is a Continuation application of prior U.S. patent application Ser. No. 13/857,306 filed Apr. 5, 2013, which claims priority under 35 U.S.C. § 119 to Korean Application Nos. 10-2012-0036082 filed on Apr. 6, 2012 and 10-2012-0036083 filed on Apr. 6, 2012, whose entire disclosures are incorporated herein by reference.

BACKGROUND

1. Field

This relates to a laundry treating machine.

2. Background

Generally, laundry treating machines may include a washing machine and a washing machine also having a drying function. A washing machine may remove various kinds of contaminants from laundry items using emulsification, friction caused by rotation of a pulsator or a drum, and impact applied to the laundry, and may automatically perform a series of cycles including a washing course, a rinsing course, and a spin-drying course. A washing machine with a drying function may also dry laundry after washing. A condensation type washing machine with a drying function may withdraw air from a tub, remove moisture from the air using condensed water, heat the air, and introduce the heated air into the tub.

BRIEF DESCRIPTION OF THE DRAWINGS

The embodiments will be described in detail with reference to the following drawings in which like reference numerals refer to like elements wherein:

FIGS. 7A and 7B are partial sectional views of a hot air collection port and a filter cleaning device of the laundry treating machine shown in FIG. 2;

DETAILED DESCRIPTION

Figure 1:
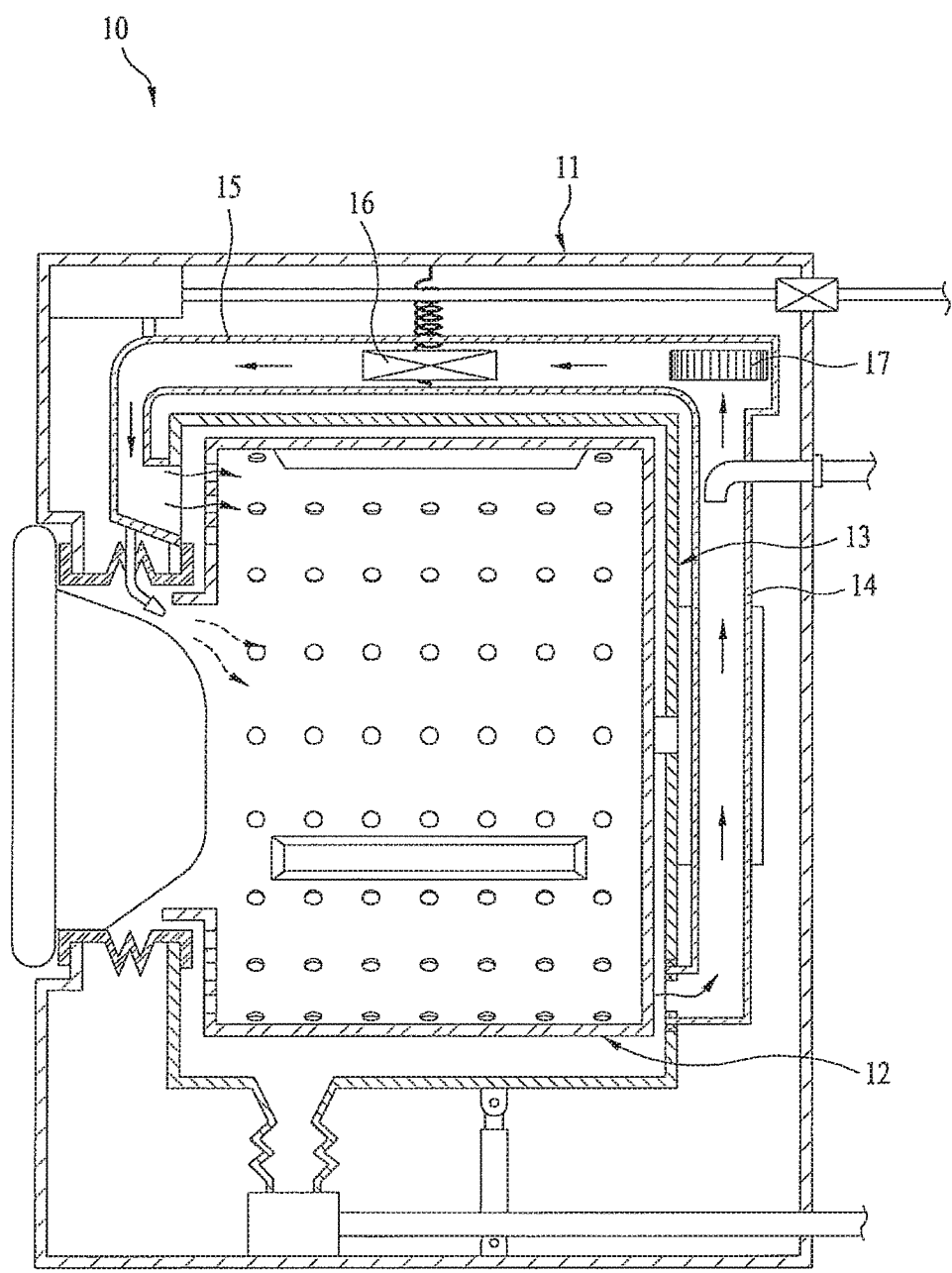
FIG. 1 is a perspective view of an exemplary condensation type washing machine with a drying function.

FIG. 1 is a perspective view of an exemplary condensation type washing machine 10 with a drying function. As shown in FIG. 1, the washing machine 10 may include a cabinet 11 having a receiving space defined therein, a tub 12 received in the cabinet 11, a drum 13 rotatably mounted in the tub 12, a condensing duct 14 formed outside the tub 12 to condense air containing moisture generated from the tub 12, a heating duct 15 connected downstream of the condensing duct 14 to heat air using a heater 16 and to supply the heated air into the tub 12, and a blowing fan 17 to circulate air from the tub 12 through the condensing duct 14 and the heating duct 15.

In such a washing machine 10, air moved by the blowing fan 17 during drying may be heated by the heater 16 provided in the heating duct 15, and the heated air may be supplied into the tub 12 to dry the laundry during rotation of the drum 13.

The air used to dry the laundry is relatively humid, and is introduced into condensing duct 14 from the tub 12. In the condensing duct 14, moisture is removed from the humid air. Additional cooling water to condense the humid air may be supplied to the condensing duct 14. The air from the condensing duct 14 may be resupplied to the heating duct 15 by the blowing fan 17.

The condensing duct 14 may be shaped like a pipe to enhance air blowing capacity of the blowing fan 17 and smooth flow of air. Moisture contained in humid air may be condensed through heat exchange between the inner surface of the condensing duct 14 and the humid air. As a result, moisture may be removed from the air. Depending on humidity levels, it may be necessary to continuously supply a relatively large amount of cooling water during drying to sufficiently condense moisture from humid air introduced into the condensing duct 14. However, the area of the condensing duct 14 is relatively small due to space constraints within the cabinet 11, and thus it may be necessary to supply a relatively large amount of cooling water for a relatively long period of time, thereby increasing cooling water consumption and drying time.

In addition, during drying, lint contained in the laundry may be introduced into the condensing duct 14 with the air may remain in the condensing duct 14, the blowing fan 17, and the heating duct 15. The lint remaining in the condensing duct 14 may reduce efficiency of the condensing duct 14. The lint remaining in the blowing fan 17 may hamper operation of the blowing fan 17. The lint remaining in the heating duct 15 may cause operational problems or combustion of the heater 16 provided in the heating duct 15.

Figure 2:
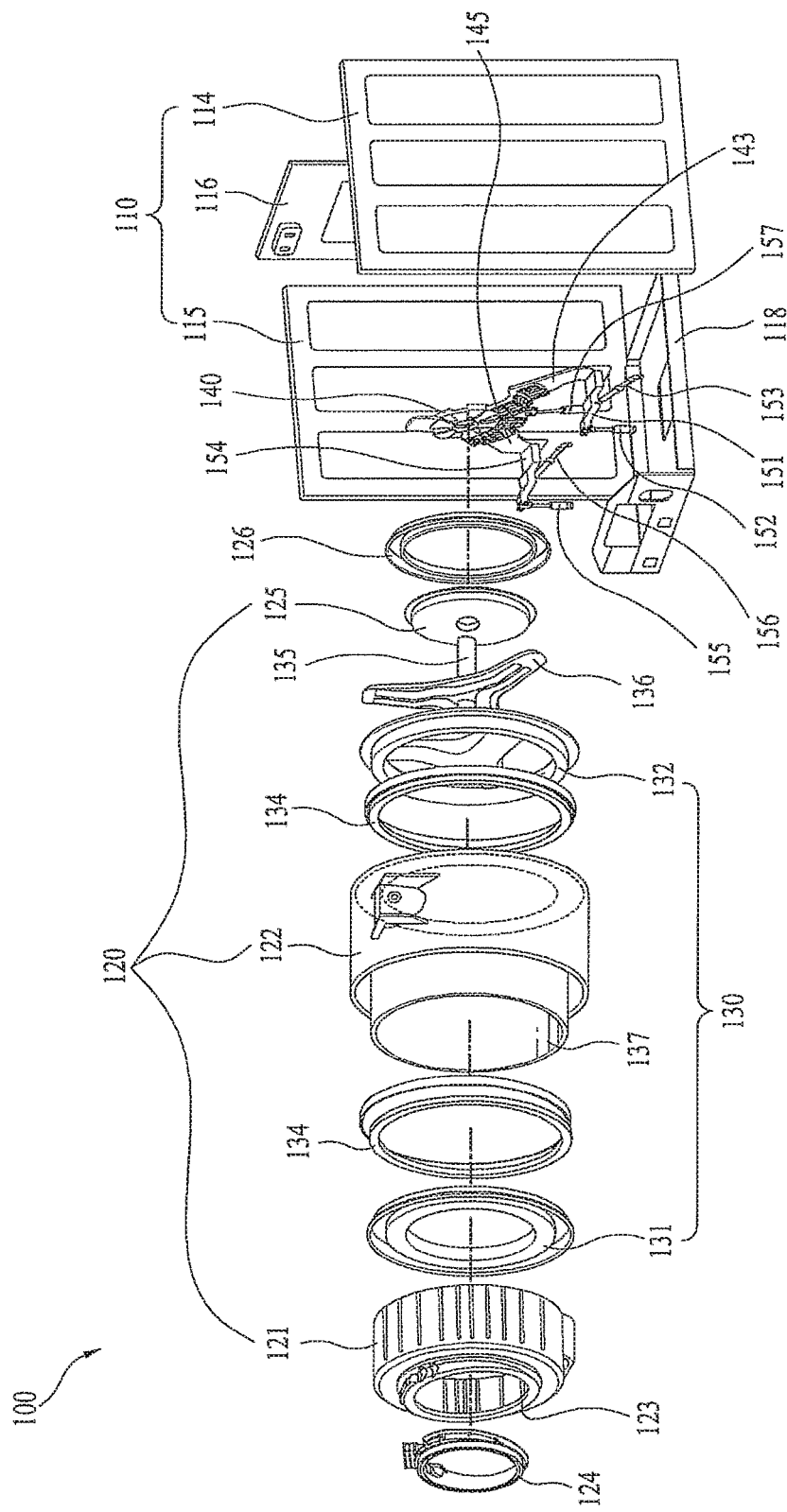
FIG. 2 is an exploded perspective view of a laundry treating machine according to an embodiment as broadly described herein.
Figure 3:
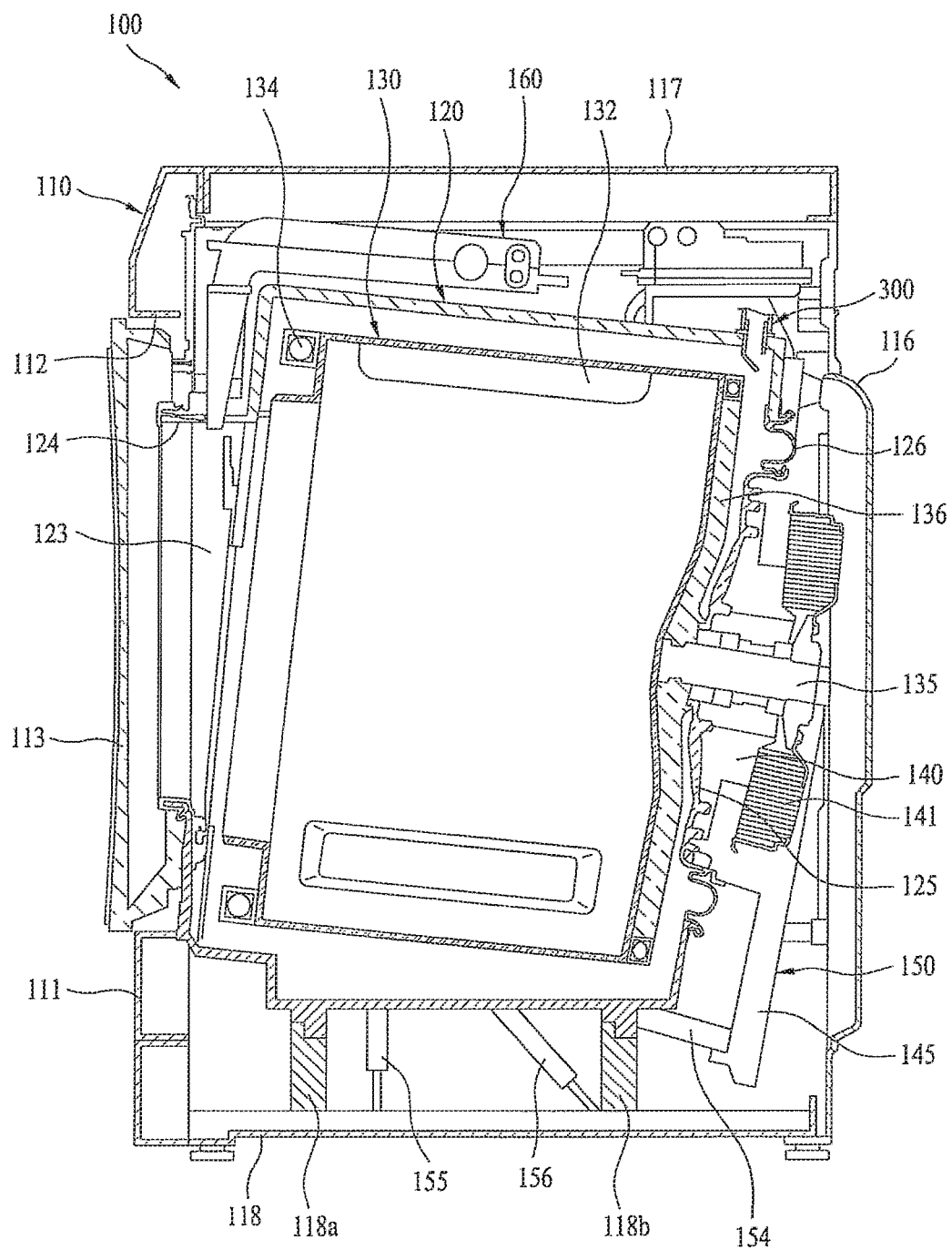
FIG. 3 is a side sectional view of the laundry treating machine shown in FIG. 2.

FIG. 2 is an exploded perspective view of a laundry treating machine 100 according to an embodiment as broadly described herein, and FIG. 3 is a side sectional view of the laundry treating machine shown in FIG. 2.

As shown in FIGS. 2 and 3, the laundry treating machine 100 may include a cabinet 110 forming an external appearance of the laundry treating machine 100, a tub 120 fixedly mounted in the cabinet 110 and having an inner surface used as a cooling surface to generate condensed water, a drum 130 rotatably mounted in the tub 120, a rotary shaft 135 connected to the drum 130 through the rear of the tub 120, a bearing housing 140 to support the rotary shaft 135, a drive motor 141 provided at the bearing housing 140 to transmit rotary force to the rotary shaft 135, a suspension device 150 coupled to the bearing housing 140 to support components connected to the bearing housing 140 and, at the same time, to absorb vibration and/or impact, and an air supply device 160 fixedly mounted to the outside of the tub 120 to heat air and to supply the heated air into the tub 120.

The cabinet 110 may include a base 118 on which the respective components are positioned, a front panel 111 having an opening 112 through which laundry is introduced, a left panel 114, a right panel 115, a rear panel 116, and a top panel 117. A door 113 to close the opening 112 may be provided in the opening 112 of the front panel 111. A water supply device 180 (see FIG. 6) to supply water from an external water source into the tub 120 may be provided in the inside upper part of the cabinet 110. A drainage device including a drainage hose and a drainage pump to discharge wash water used to wash and rinse laundry from the cabinet 110 may be provided in the inside lower part of the cabinet 110.

As shown in FIG. 2, the tub 120 may include a front tub 121 forming a front part of the tub 120 and a rear tub 122 forming a rear part of the tub 120. The front tub 121 and the rear tub 122 may be coupled to each other via coupling members, such as screws, to form a space in which the drum 130 is received.

The front tub 121 may include an introduction part 123 connected to the door 113 such that laundry is introduced through the introduction part 123. A rim 121b protruding to the front of the tub 120 may be formed along the inner circumference of the introduction part 123. An air discharge port 165 of the air supply device 160 may be connected to the rib 121b. The rim 121b may include a front gasket 124 to maintain airtightness between the rim 121b and the opening 112 of the front panel 111. The front gasket 124 may also prevent introduction of foreign matter into a gap between the tub 120 and the drum 130.

The rear tub 122 may be open at the rear thereof. A tub back wall 125 to close the rear of the rear tub 122 and a rear gasket 126 may be provided at the rear of the rear tub 122. The rear gasket 126 may be connected to the tub back wall 125 and the rear tub 122 in a sealed state to prevent leakage of wash water from the tub 120.

A cooling water supply device 300 to generate condensed water using the rear of the rear tub 120 may be provided at one side of the outer circumference of the rear tub 120. The rear of the rear tub 120 may function as a condensing surface due to the cooling water supplied from the cooling water supply device 300. Generation of condensed water using the rear of the rear tub 120 will hereinafter be described in detail with additional drawings.

During rotation of the drum 130, the tub back wall 125 may vibrate together with the drum 130. For this reason, the tub back wall 125 may be spaced from the rear tub 122 by a distance sufficient to prevent interference between the tub ball wall 125 and the rear tub 122. The rear gasket 126, disposed between the tub back wall 125 and the rear tub 122, may be made of a flexible material so that relative motion between the tub back wall 125 and the rear tub 122 is allowed without interference between the tub back wall 125 and the rear tub 122. The rear gasket 126 may have a bellows that can extend to a length sufficient to allow such relative motion.

The tub 120 may be upwardly supported by supporters 118a and 118b provided at the base 118 of the cabinet 110 in the vertical direction and, at the same time, may be fixed by additional coupling members (for example, screws or bolts). In addition, the tub 120 may be fixed to the front panel 111 and the rear panel 116 or the left panel 114 and the right panel 115 by coupling members.

The tub 120 may be provided at the rear upper part thereof with a cooling water supply device 300 to supply cooling water to cool the inner surface of the tub 120 such that the inner surface of the tub 120 forms a cooling surface to generate condensed water. In certain embodiments, the cooling water supply device 300 may be provided at the rear upper part of the rear tub 122, or other positions as appropriate. Hereinafter, the cooling water supply device 300 will be described as being provided at the rear upper part of the tub 120, simply for convenience of description.

The air supply device 160 may be provided at the upper part of the tub 120 to circulate and heat air in the tub 120 during a drying cycle of the laundry treating machine 100. That is, the air supply device 160 may be configured to heat air discharged from the tub 120 and to introduce the heated air into the tub 120.

The drum 130 may include a front drum 131, a center drum 137, and a rear drum 132. Weight balancers 134 provided at the front part of the front drum 131 and the rear part of the rear drum 132 may suppress vibration of the drum 130 during rotation of the drum 130. Lifts 133 may be provided at the inner circumference of the center drum 137.

The rear drum 132 may be connected to a spider 136, and the spider 136 may be connected to the rotary shaft 135. The drum 130 may be rotated in the tub 120 by rotary force transmitted through the rotary shaft 135. The rotary shaft 135 may be directly connected to the drive motor 141 through the tub back wall 125. Specifically, the rotary shaft 135 may be directly connected to a rotor of the drive motor 141. The bearing housing 140 of the suspension device 150 may be coupled to the rear of the tub back wall 125.

Figure 4:
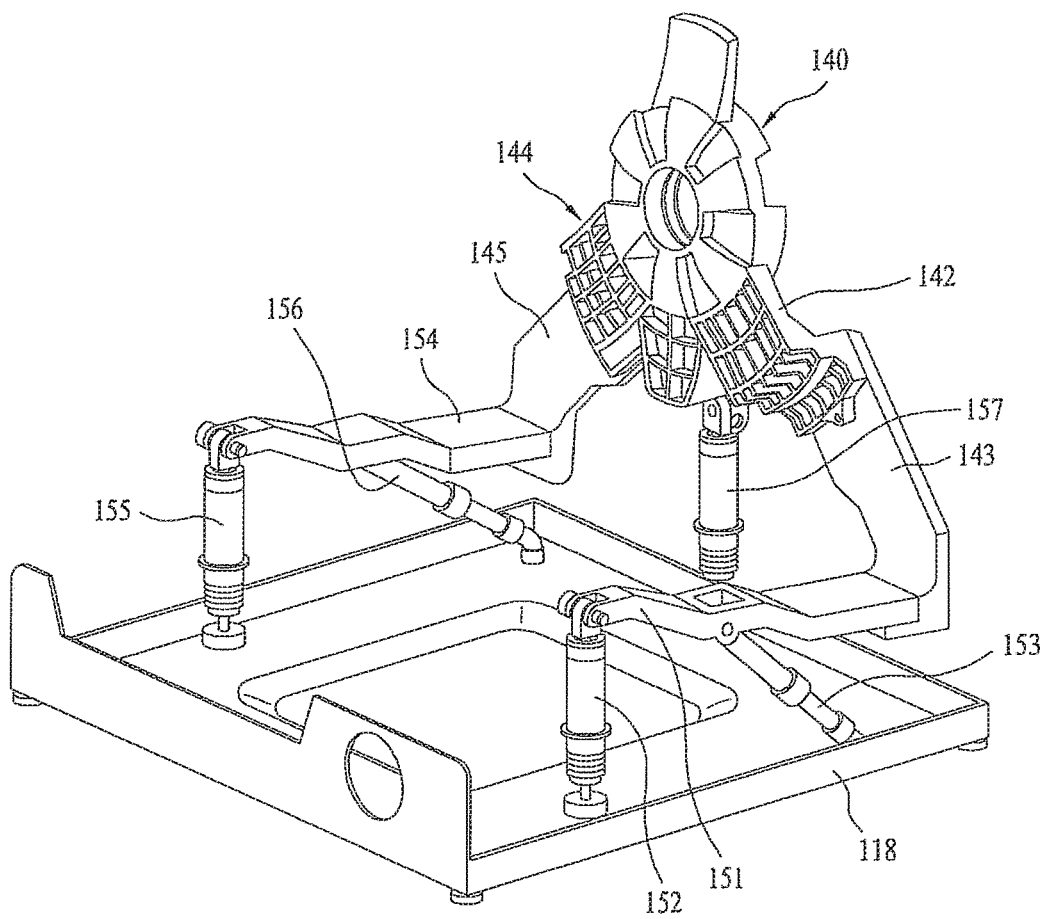
FIG. 4 is a perspective view of a suspension device of the laundry treating machine shown in FIG. 2.
Figure 5:
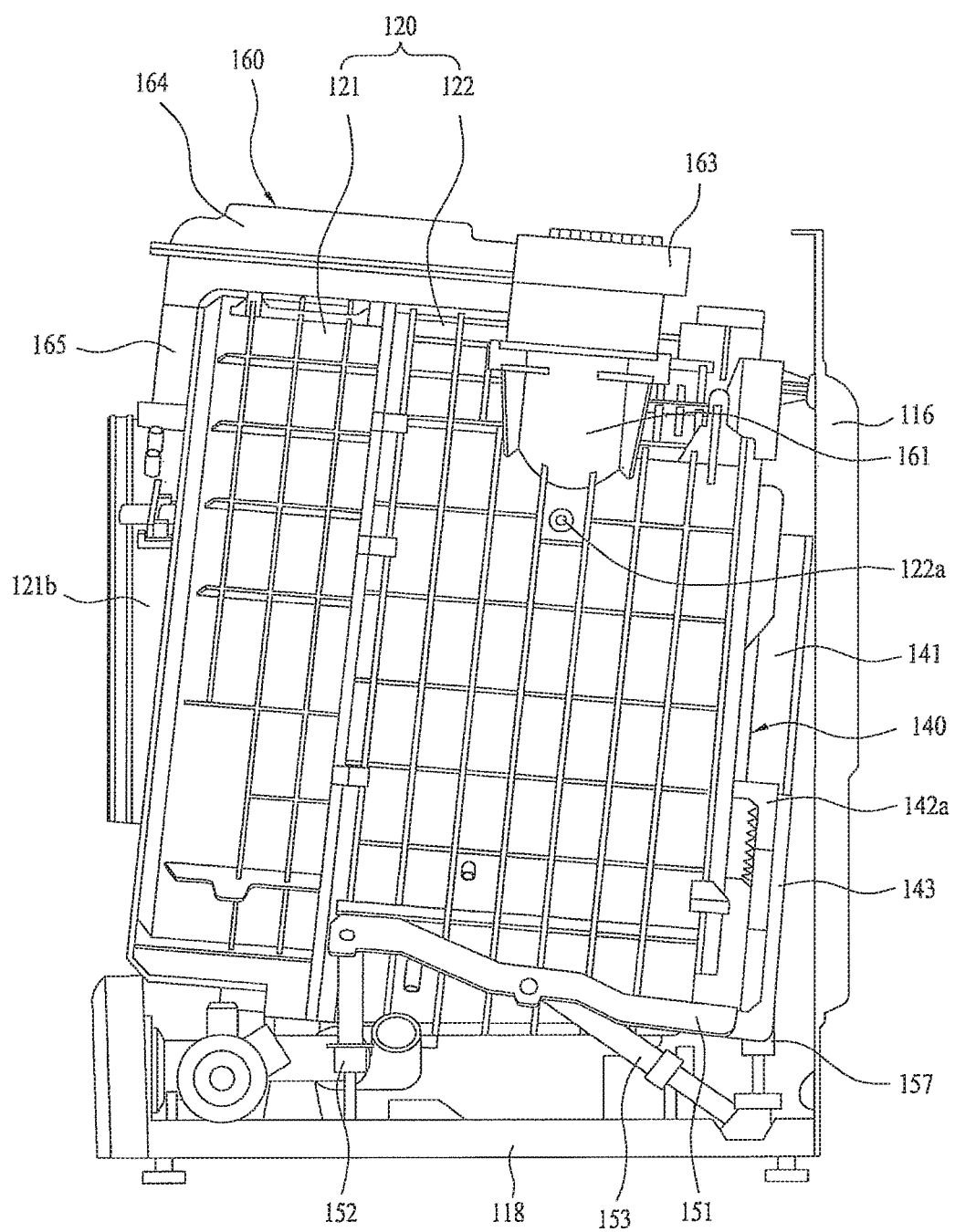
FIG. 5 is a side view of a coupling state between a tub and the suspension device of the laundry treating machine shown in FIG. 2.

The suspension device 150 of the laundry treating machine 100 will be described in detail with reference to FIGS. 4 and 5.

The suspension device 150 may include a bearing housing 140 to support the rotary shaft 135, first and second weights 143 and 145 respectively connected to first and second extensions 142 and 144 of the bearing housing 140, first and second suspension brackets 151 and 154 respectively connected to the first and second weights 143 and 145, and first, second and third spring dampers 152, 155 and 157 and first and second dampers 153 and 156 connected to the first and second suspension brackets 151 and 154 and the bearing housing 140 to elastically support the bearing housing 140. The bearing housing 140 may rotatably support the rotary shaft 135 between the drive motor 141 and the tub back wall 125. The bearing housing 140 may be elastically supported by the first, second and third spring dampers 152, 155 and 157 and the first and second dampers 153 and 156.

The tub back wall 125, disposed at the rear of the tub 120, may be coupled to one side of the bearing housing 140. The rotary shaft 135, coupled to the drum 130, may extend into the bearing housing 140. The bearing housing 140 may include a bearing to smoothly rotate the rotary shaft 135 and support the rotary shaft 135. The drive motor 141 may be fastened to the other side of the bearing housing 140.

The first extension 142 and second extension 144 of the bearing housing 140 may be symmetrically arranged, and extend in the radial direction. The suspension device 150 may be fastened to the first extension 142 and the second extension 144. The bearing housing 140 is elastically supported by the suspension device 150.

The first and second weights 143 and 145 may balance the drum 130 when laundry is received in the drum 130, and may serve as mass in a vibration system in which the drum 130 vibrates. The first and second weights 143 and 145 may be respectively connected to the first extension 142 and second extension 144 of the bearing housing 140.

The first and second suspension brackets 151 and 154 may be respectively connected to corresponding ends of the first and second weights 143 and 145. The first and second suspension brackets 151 and 154 may extend from opposite lower parts of the tub 120 to the front of the tub 120, respectively. The first and second suspension brackets 151 and 154 may be supported by the first, second and third spring dampers 152, 155 and 157 and the first and second dampers 153 and 156.

The first spring damper 152 may be connected between the first suspension bracket 151 and the base 118, and the second spring damper 155 may be connected between the second suspension bracket 154 and the base 118. The third spring damper 157 may be connected between the bearing housing 140 and the base 118. One rear point and two front left and right points may be supported by the first, second and third spring dampers 152, 155 and 157 to provide shock absorption.

The first damper 153 may be mounted at an incline between the first suspension bracket 151 and the rear of the base 118, and the second damper 156 may be mounted at an incline between the second suspension bracket 154 and the rear of the base 118.

The first and second weights 143 and 145, the first and second suspension brackets 151 and 154, the first and second spring dampers 152 and 155, and the first and second dampers 153 and 156 may be symmetric with respect to the rotary shaft 135 of the drum 130. The respective dampers may be coupled to the base 118 via additional rubber bushings such that the respective dampers may tilt at predetermined angles. As a result, the drum 130 and the bearing housing 140 may be elastically supported by the first and second suspension brackets 151 and 154 and the first, second and third spring dampers 152, 155 and 157 such that the drum 130 and the bearing housing 140 may float in the tub 120.

The drive motor 141 may be fastened to the rear of the bearing housing 140 and directly coupled to the rotary shaft 135. Velocity of the drive motor 141 may be controlled by a controller.

Figure 6:
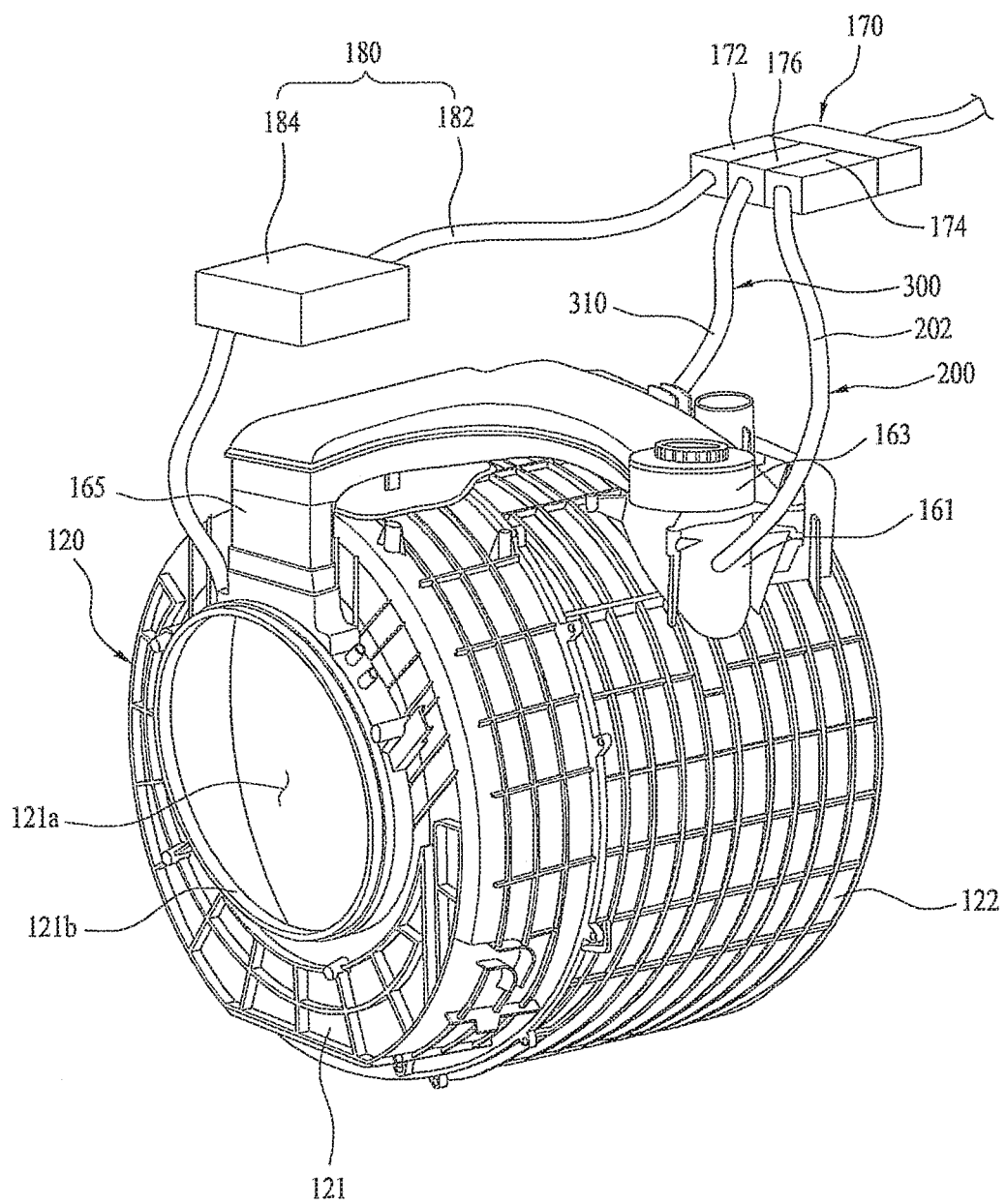
FIG. 6 is a perspective view of an air supply device and the tub of the laundry treating machine shown in FIG. 2.

FIG. 6 is a perspective view of the air supply device 160 and the tub 120 of the laundry treating machine 100. The air supply device 160 may include an air collection port 161 formed at one side of the outer circumference of the tub 120, a blowing fan 163 to collect and move air through the air collection port 161, a heating duct 164 to heat the air moved by the blowing fan 163, and an air discharge port 165 to guide the air heated by the heating duct 164 to the tub 120. The air collection port 161 may be formed through one side of the outer circumference of the tub 120. A lint filter 162 to filter lint generated during drying of laundry may be provided at the inner circumference of the air collection port 161 such that the lint filter 162 extends along the outer circumference of the tub 120. A filter cleaning device 200 may be provided at the inside of the air collection port 161 (see FIGS. 7A and 7B).

The blowing fan 163 may be provided at the upper side of the air collection port 161. Upon operation of the blowing fan 163, air in the tub 120 may be introduced into the air collection port 161 and directed to the heating duct 164.

The heating duct 164 may heat the air moved by the blowing fan 163 to generate hot air using a heater to heat the air moving in the heating duct 164. The air heated in the heating duct 164 may be supplied into the tub 120 through the air discharge port 165 to dry laundry.

Wash water to wash and rinse laundry, cleaning water to clean the lint filter 162, and cooling water to cool tub 120 to generate condensed water may be supplied to the laundry treating machine 100.

Hereinafter, construction of the water supply device 180, the filter cleaning device 200, and the cooling water supply device 300 and a water supply structure will be described with respect to the accompanying drawings.

As shown in FIG. 6, a valve assembly 170 may selectively or simultaneously supply water from an external water source to the respective components (for example, the water supply device 180, the filter cleaning device 200, and the cooling water supply device 300). The valve assembly 170 may include a plurality of valves corresponding to the respective components, to which water is to be supplied. That is, the valve assembly 170 may include a water supply valve 172 to control the supply of wash water (or rinse water) to the water supply device 180, a cleaning water valve 174 to control the supply of cleaning water to the filter cleaning device 200, and a cooling water valve 176 to control the supply of cooling water to the inner surface of the tub 120 to generate condensed water. The valve assembly 170 may also include one or more additional valves in a case in which one or more additional components (for example, a steam generator) using water are further provided.

The water supply device 180 may include a water supply line 182 to receive wash water from the water supply valve 172 and a detergent supply device 184 mounted in the water supply line 182 to receive detergent such that the water supplied through the water supply line 182 is introduced into the tub 120 together with the detergent. The wash water having passed through the detergent supply device 184 may be supplied into the tub 120 from the front of the tub 120 through an additional hose.

The filter cleaning device 200 may separate lint from the lint filter 162 using wash water supplied from the water supply device 180 such that the lint is collected in the tub 120. Hereinafter, the filter cleaning device 200 of the laundry treating machine 100 will be described in detail with reference to FIGS. 7A to 10.

As previously described, air may be heated by the heating duct 164 and introduced into the drum 130 through the air discharge port 165 connected to the front upper side of the tub 120. The high-temperature dry air may dry laundry in the drum 130, with the result that the high-temperature dry air becomes high-humidity air containing moisture. The high-humidity air containing moisture flows to the heating duct 164 through the air collection port 161 connected to the rear upper side of the tub 120 to achieve air circulation.

Figure 7A:
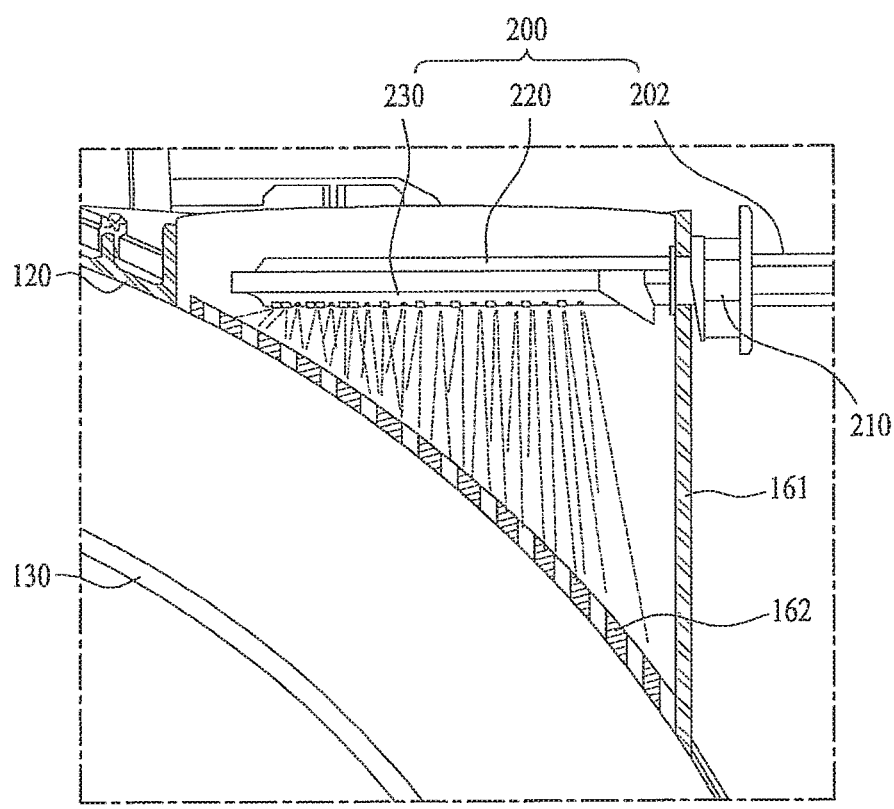

The air passing through the air collection port 161, i.e. the air used to dry laundry, may contain foreign matter and lint, and thus it may be necessary to filter the air. Consequently, the laundry treating machine 100 may include a lint filter 162 provided in the air collection port 161 to filter foreign matter and lint contained in air passing through the air collection port 161. A filtering effect may be improved by an increased sectional area of the lint filter 162. To this end, the lint filter 162 may be provided in the air collection port 161 at a predetermined inclination angle as shown in FIGS. 7A and 7B.

As previously described, it may be necessary to remove lint accumulated on the lint filter 162 after long-term use of the laundry treating machine 100. That is, if the lint filter 162 is clogged by lint after long-term use of the laundry treating machine 100, the amount of air passing through the air collection port 161 and introduced into the heating duct 164 may be considerably reduced. Under this condition, the blowing fan 163 may over-rotate due to the reduction in amount of the introduced air (acting as frictional force), and the heater may be overheated. These abnormalities may cause operational problems and pose a fire risk.

Therefore, a filter cleaning device 200 to downwardly spray cleaning water toward the lint filter 162 to remove lint from the lint filter 162 may be provided above the lint filter 162 in the air collection port 161.

The filter cleaning device 200 may include a fastening member 210 connected to a cleaning water line 202 of the water supply device 180 provided in the laundry treating machine 100, the fastening member 210 having a hollow par through which cleaning water may flow, a main body 220 extending from the fastening member 210, and a cleaning water spray device 230 fastened to the lower side of the main body 220, the cleaning water spray device 230 having one open side through which the cleaning water introduced into the fastening member 219 may flow, and the other side closed such that the cleaning water is sprayed downward.

The fastening member 210 may be connected to a water supply channel formed in the shape of a tube or pipe. For example, the fastening member 210 may have a circular shape. The fastening member 210 may be provided perpendicularly to one side of the air collection port 161 to prevent leakage of cleaning water and easy fastening between the fastening member 210 and the air collection port 161. However, the fastening angle between the fastening member 210 and the air collection port 161 may be adjusted as necessary for a particular installation environment.

A spray module formed by the main body 220 together with the cleaning water spray device 230 may be arranged in parallel to the fastening member 210 fastened perpendicularly to one side of the air collection port 161 as shown in FIG. 7A. Alternatively, the spray module may be inclined such that the tip of the spray module is higher than the fastening member 210 as shown in FIG. 7B. When the spray module is inclined such that the tip of the spray module is higher than the fastening member 210 as shown in FIG. 7B, the height difference between the spray module and the lint filter 162 may increase impact with respect to lint attached to the lower side of the lint filter 162 and a spray radius of the cleaning water spray device 230 may be increased. Consequently, a lint removal efficiency of the spray module shown in FIG. 7B may be somewhat greater than that of the spray module shown in FIG. 7A.

Figure 9:
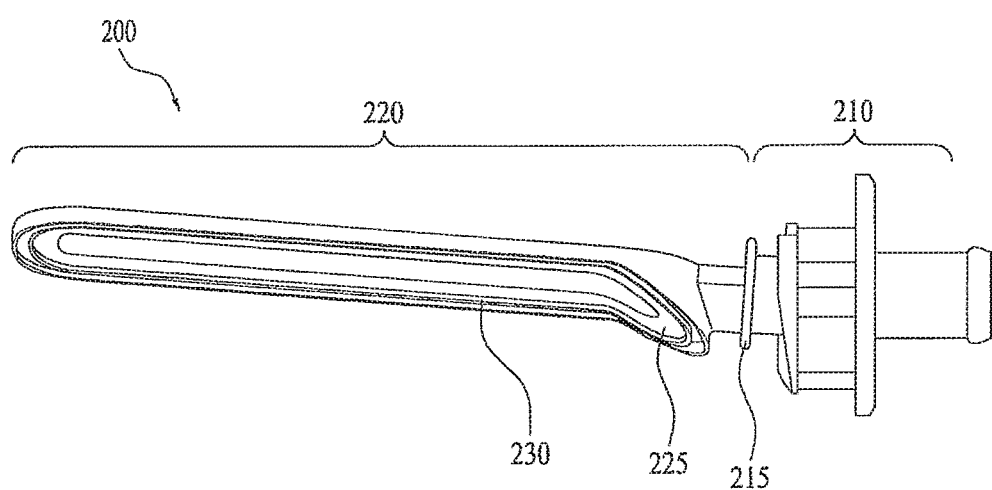
FIG. 9 is a perspective view of the filter cleaning device shown in FIGS. 7A and 7B, with the cleaning water spray device removed.
Figure 10:
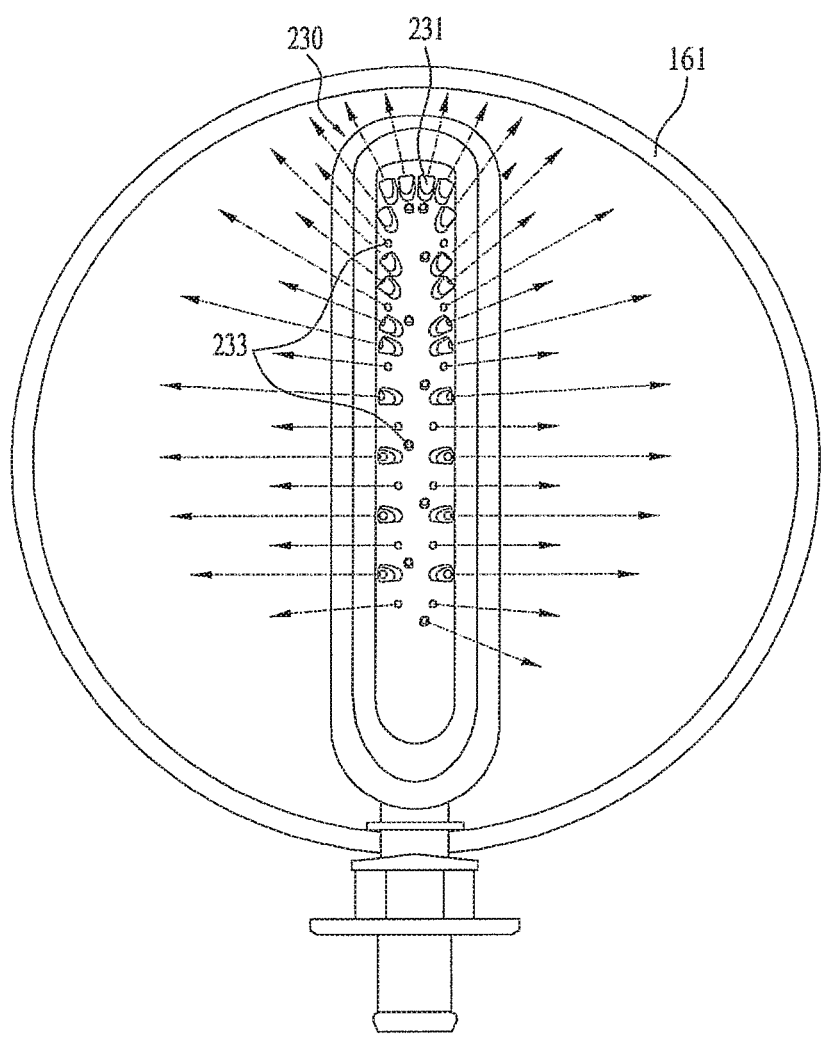
FIG. 10 illustrates a spray radius of the cleaning water spray device shown in FIGS. 7A-8.

Referring to FIG. 9, the fastening member 210 may include a fastening rib 215 extending from the outer circumference thereof to prevent leakage of cleaning water from the air collection port 161 during spray of the cleaning water. The fastening rib 215 may more securely fasten the filter cleaning device 200 to the air collection port 161.

In certain embodiments, the filter cleaning device 200 may operate only when lint is collected to such an extent that the lint disturbs passage of air through the lint filter 162.

That is, the filter cleaning device 200 may be formed in a shape corresponding to the sectional area of the lint filter 162 to remove lint. In addition, the filter cleaning device 200 may be formed in a shape to minimally restrict interference with the flow of air passing through the air collection port 161. Consequently, the main body 220 may have a long rod shape which does not interfere with the flow of air passing through the air collection port 161.

The main body 220 may include a water leakage prevention protrusion 225 inclined toward the fastening member 210 to primarily prevent leakage of cleaning water from the air collection port 161 during spray of the cleaning water in the same manner as the fastening rib 215 of the fastening member 210.

Figure 8:
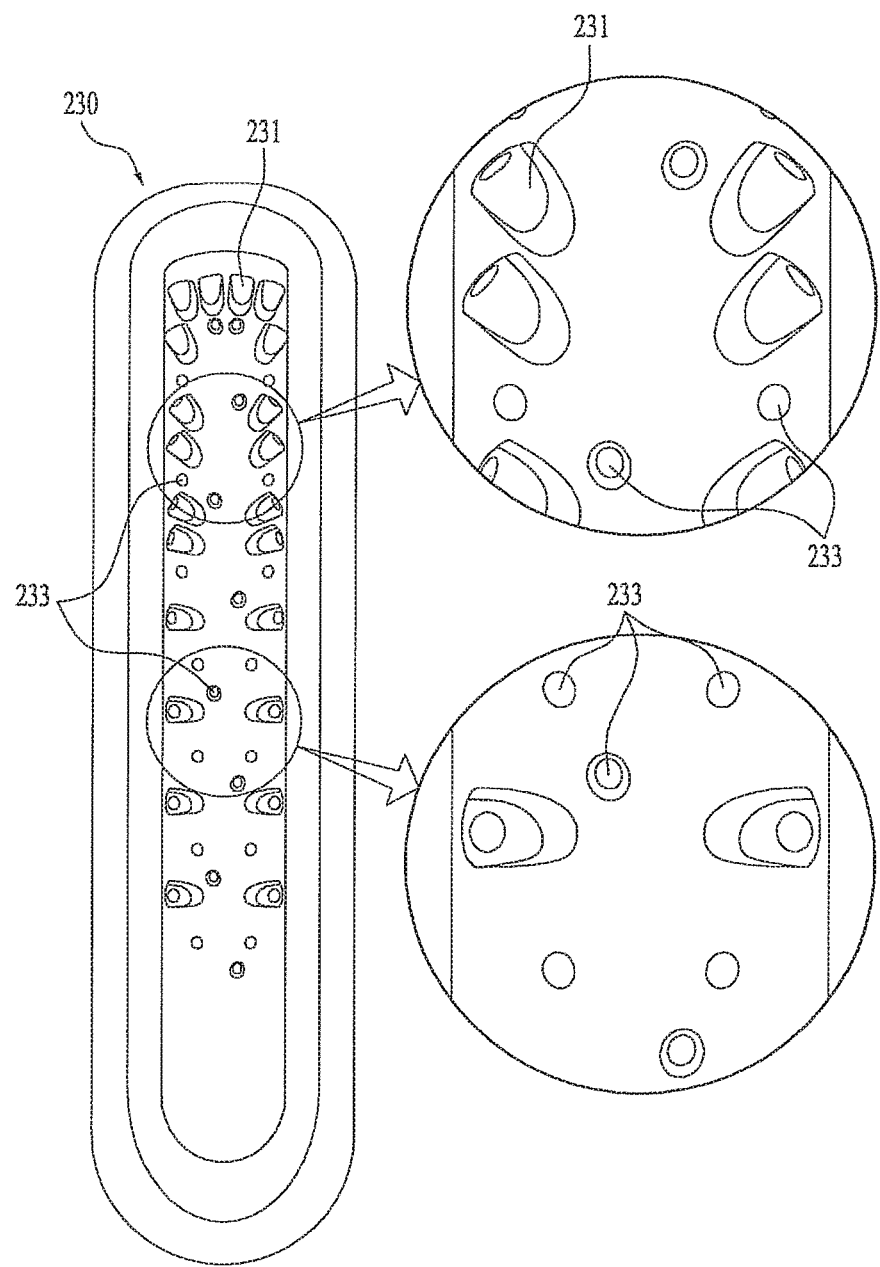
FIG. 8 is a perspective view of a cleaning water spray device of the laundry treating machine shown in FIG. 2.

Referring to FIG. 8, the cleaning water spray device 230 may include a plurality of first spray nozzles 231 formed at the edge thereof in a protruding fashion to spray cleaning water at a predetermined angle and a plurality of second spray nozzles 233 formed at the middle part thereof and among the respective first spray nozzles 231 to spray cleaning water in the vertical direction, i.e., in a direction somewhat orthogonal to the face of the spray device 230.

The first spray nozzles 231 may be formed in a protruding fashion. Each of the first spray nozzles 231 may include a spray hole formed at one side of a protruding portion thereof so as to form a certain spray angle with respect the center of the cleaning water spray device 230. Consequently, the first spray nozzles 231 may have a wider radius cleaning range to clean the lint filter 162.

The first spray nozzles 231 and the second spray nozzles 233 may be formed so as to be symmetric with respect to a longitudinal axis of the cleaning water spray device 230. However, disposition of the spray nozzles may be adjusted as appropriate.

The filter cleaning device 200, i.e. the fastening member 210, the main body 220, and the cleaning water spray device 230, may be manufactured by injection molding. For example, the fastening member 210 and the main body 220 may be integrally formed by injection molding through a single process. The cleaning water spray device 230 may be separately formed by injection molding due to the structural characteristics of the first spray nozzles 231, which are formed in a protruding fashion. In this case, the main body 220 and the cleaning water spray device 230 may be coupled to each other by welding between fastening surfaces of the main body 220 and the cleaning water spray device 230. However, the coupling method may be adjusted as appropriate.

The cooling water supply device 300 may generate condensed water using the rear of the rear tub 120. The cooling water supply device 300 may supply cooling water to the rear of the rear tub 120 such that the rear of the rear tub 120 functions as a condensing surface. Hereinafter, the cooling water supply device 300 will be described in detail with respect to FIGS. 11 and 12.

Figure 11:
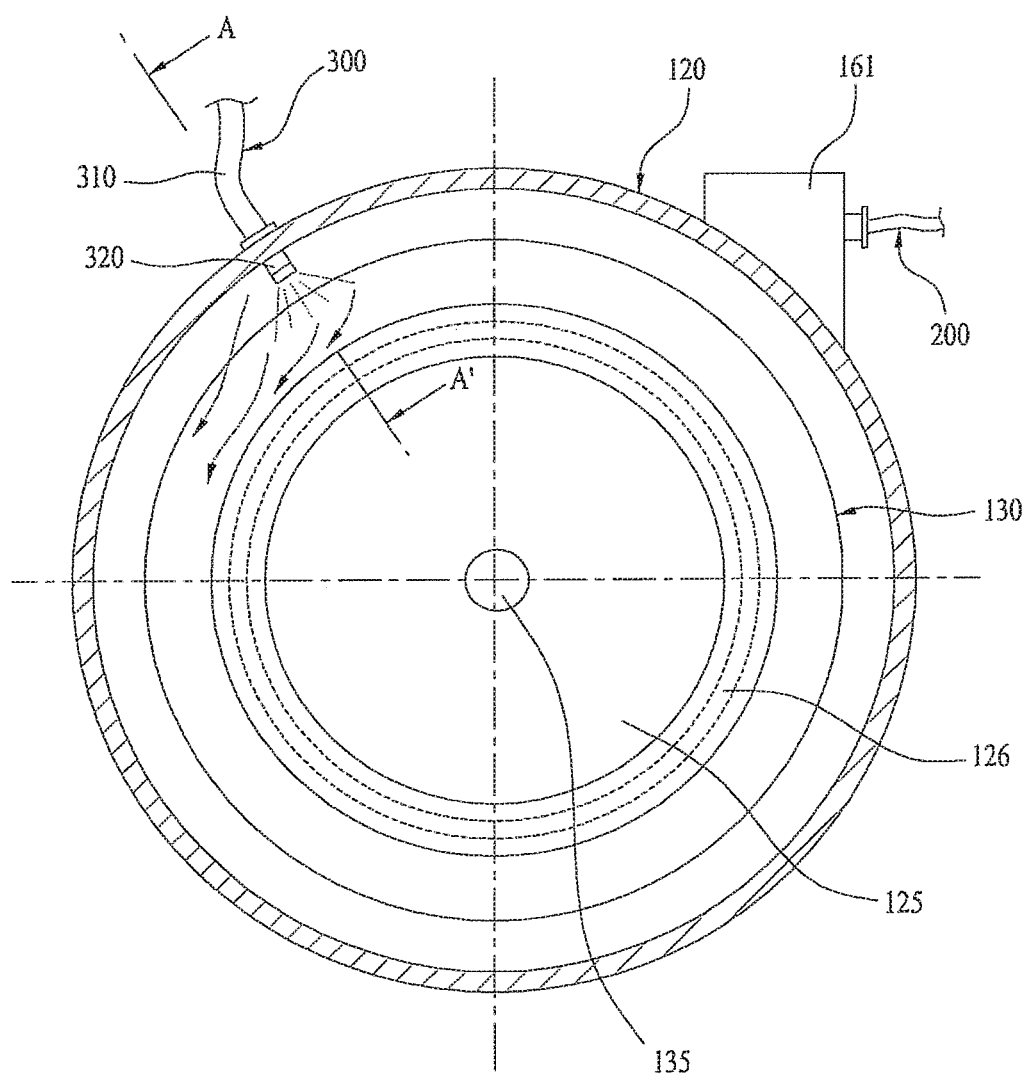
FIG. 11 is a schematic view of a rear inner surface of the tub of the laundry treating machine shown in FIG. 2.
Figure 12:
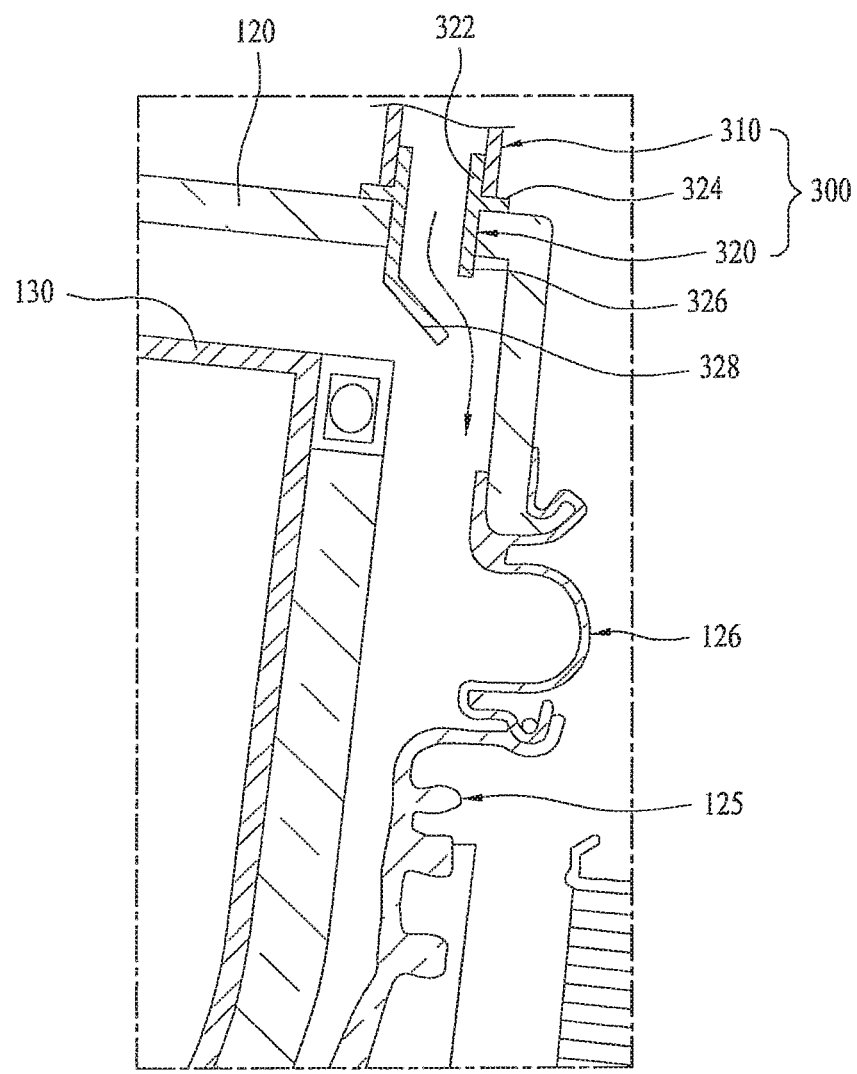
FIG. 12 is a partial sectional view taken along line A-A' of FIG. 11.

As shown in FIGS. 11 and 12, the cooling water supply device 300 may include a cooling water line 310 to receive cooling water from the cooling water valve 176 and a cooling water nozzle 320 disposed at the rear upper side of the tub 120 to spray cooling water to the rear inner surface of the tub 120. The cooling water nozzle 320 may be provided at the rear upper part of the tub 120. The cooling water nozzle 320 may be formed in a direction opposite to the air collection port 161 formed at the tub 120 about the rotary shaft 135. For example, the cooling water nozzle 320 may be located at an angle of about 20 to 40 degrees with respect to a vertical axis passing through the rotary shaft 135. Such an orientation of the cooling water nozzle 320 may allow cooling water sprayed from the cooling water nozzle 320 to smoothly flow along the rear of the tub 120.

That is, in a case in which the cooling water nozzle 320 is located at the middle upper part of the tub 120, cooling water sprayed from the cooling water nozzle 320 may flow vertically along the rear gasket 126 and the tub back wall 125 coupled to the rear of the tub 120. As a result, flow area of the cooling water is reduced and time provided to cool the rear of the tub 120 is relatively short, thus deteriorating a cooling effect of the tub 120.

In a case in which the cooling water nozzle 320 is located at the edge of the tub 120, flow area of cooling water cooling water sprayed from the cooling water nozzle 320 is reduced and time provided to cool the rear of the tub 120 is relatively short, thus deteriorating a cooling effect of the tub 120.

In contrast, in a case in which the cooling water nozzle 320 is provided at an angle of about 20 to 40 degrees with respect to the vertical axis in a direction opposite to the air collection port 161 as described above, cooling water sprayed from the cooling water nozzle 320 flows downward along the rear of the tub 120 for a relatively long period of time and over a relatively large flow area to cool the tub 120, thus improving a cooling effect of the tub 120.

That is, when generating condensed water using the inner surface of the tub 120 in this manner, the condensed water may be generated using a wider area, thereby improving a condensed water generation effect.

The cooling water nozzle 320 may spray cooling water supplied form the cooling water line 310 widely to the rear of the tub 120. The cooling water nozzle 320 may have a hollow body. A connection end 322, to which the cooling water line 310 is connected, may be formed at the upper part of the cooling water nozzle 320, and a nozzle end 326, which is located inside the tub 120, may be formed at the lower part of the cooling water nozzle 320. Between the connection end 322 and the nozzle end 326 may be a catching end 324, by which the cooling water nozzle 320 is mounted to the tub 120. A deflection plate 328 to deflect cooling water to the rear of the tub 120 in a spreading fashion may be provided at the lower part of the nozzle end 326.

Hereinafter, operation of a laundry treating machine as embodied and broadly described herein will be described. The filter cleaning device and the cooling water supply device may be operated during a drying cycle of the laundry treating machine 100. Consequently, a description of a washing cycle and a rinsing cycle of the laundry treating machine 100 will be omitted, and the drying cycle of the laundry treating machine 100 will be described in brief.

First, the blowing fan 163 of the air supply device 160 may be operated during a drying cycle. As the blowing fan 163 is operated, air from the tub 120 may be suctioned through the air collection port 161 and forwarded to the heating duct 164 by the blowing fan 163. The air forwarded to the heating duct 164 may be heated by the heater provided in the heating duct 164 and supplied into the tub 120 through the air discharge port 165.

The air supplied into the tub 120 may dry laundry in the tub 120 (specifically, the drum 130). The air used to dry the laundry may become humid due to moisture evaporated from the laundry. The humid air may be introduced through the air collection port 161 and circulated.

Lint generated during drying of the laundry may be filtered by the lint filter 162 of the air collection port 161. The filtered lint may be separated from the lint filter 162 through operation of the filter cleaning device 200 during the drying cycle or during a washing/rinsing cycle, introduced into the tub 120, and discharged from the laundry treating machine 100 through the drainage device.

Moisture generated from the laundry during the above process may be circulated together with the air. The moisture may be removed by the cooling water supply device 300. First, when cooling water is supplied under control of the cooling water valve 176, the cooling water may flow along the cooling water line 310 and be sprayed onto the rear of the tub 120 through the cooling water nozzle 320. The cooling water sprayed onto the rear of the tub 120 may flow downward along the rear of the tub 120 to cool the inner circumference of the tub 120. At this time, heat exchange between the humid air and the surface of the tub 120 may be performed so that moisture contained in the humid air is condensed at the rear of the tub 120, and condensed air generated.

The cooling water supplied by the cooling water supply device 300 may be discharged from the laundry treating machine 100 through the drainage device after cooling the rear if the tub 120. Supply time and intervals of the cooling water supplied by the cooling water supply device 300 may be shorter than drainage time and intervals of the cooling water drained by the drainage device. In this case, staying time of the cooling water in the tub 12 may be increased to further improve a tub cooling effect. The cooling water may be repeatedly supplied several times, or several ten times, such as, for example, supplying cooling water for 3 to 5 seconds and interrupting the supply of cooling water for 5 to 7 seconds. Also, the cooling water may be repeatedly drained several times to several ten times under a condition in which the cooling water is drained for 10 to 20 seconds and the drainage of the cooling water is interrupted for 240 to 270 seconds.

In a laundry machine as embodied and broadly described herein, humid air having high temperature may remain in the tub 120, with air outside the tub 120 having a lower temperature than the air inside the tub 120, allowing the air to be condensed at the inner circumference of the tub 120 due to the temperature difference between the inside and the outside of the tub 120, even though no water is supplied from the cooling water supply device 300.

Even in this case, a condensing amount may be greater than a condensing amount provided by the condensing duct 14 shown in FIG. 1. That is, in the condensing duct 14, condensation is derived through a smaller area than the inner circumference of the tub 120. In a case in which condensation is derived at the inner circumference of the tub 120, on the other hand, the cooling surface for condensation is larger, the larger condensing surface improving condensing efficiency.

Furthermore, because cooling water is supplied to the rear of the tub 120, cooling efficiency may be greater than in a case in which no cooling water is supplied to the rear of the tub 120.

In a laundry treating machine as embodied and broadly described herein, the inner surface of the tub forms a condensing surface to remove moisture from hot air used to dry laundry. Due to the relatively large condensing surface, condensing efficiency may be improved and waste of cooling water may be avoided.

In a laundry treating machine as embodied and broadly described herein, a lint filter may filter lint from air circulated in the laundry treating machine after drying laundry, thereby preventing problems associated with the accumulation of lint.

In a laundry treating machine as embodied and broadly described herein, a filter cleaning device may clean the lint filter to filter lint from air circulated in the laundry treating machine after drying laundry, thereby achieving easy cleaning of the lint filter.

The laundry treating machine as embodied and broadly described herein may include an improved condensing structure to remove moisture from hot air used to dry laundry, thereby improving condensing efficiency.

The laundry treating machine as embodied and broadly described herein may include a lint filter to filter lint from air and a filter cleaning device to clean the lint filter, thereby preventing problems due to accumulation of lint.

A laundry treating machine is provided, including a condensing structure in which moisture removal from hot air used to dry laundry is improved, thereby improving condensing efficiency.

A laundry treating machine is provided, including a lint filter to filter lint from air and a filter cleaning unit to clean the lint filter.

A laundry machine as embodied and broadly described herein may include a tub to receive wash water, a drum rotatably provided in the tub, an air supply unit to supply air to the tub, a lint filter to filter lint from the air circulated by the air supply unit, a filter cleaning unit to supply cleaning water to the lint filter to remove the lint from the lint filter, and a cooling water supply unit to supply cooling water to an inner surface of the tub such that moisture contained in air is condensed at the inner surface of the tub.

The air supply unit may be located at an upper part of the tub to collect air on an outer circumference of the tub and to supply the air to a front of the tub.

The air supply unit may include an air collection port formed through the outer circumference of the tub, a blowing fan located at an upper part of the air collection port to move air, a heating duct to heat the air moved by the blowing fan, and an air discharge port to supply the air heated by the heating duct to the front of the tub.

The tub may include a cooling water supply unit to supply cooling water to a rear inner surface of the tub such that the rear inner surface of the tub forms a condensing surface to generate condensed water.

The cooling water supply unit may include a cooling water line forming a route along which the cooling water flows and a cooling water nozzle fixed to the tub to spray the cooling water to a rear of the tub.

The cooling water nozzle may include a connection end, to which the cooling water line is connected, a catching end, by which the cooling water nozzle is mounted to the tub, and a nozzle end to spray the cooling water to the rear of the tub.

The nozzle end may include a reflection plate to reflect the cooling water to the rear of the tub.

The filter cleaning unit may spray cleaning water to an inside of the tub from an outside of the lint filter.

The filter cleaning unit may include a main body having a hollow part, through which cleaning water is introduced, and a cleaning water spray unit fastened to the main body such that one side of the cleaning water spray unit is open and the other side of the cleaning water spray unit is closed, the cleaning water spray unit having a hollow part, through which cleaning water is introduced.

The filter cleaning unit may further include a fastening member having one end connected to the cleaning water line and the other end extending from the main body or the cleaning water spray unit, the fastening member communicating with the main body or the cleaning water spray unit such that cleaning water flows to the hollow part.

The fastening member may include a fastening rib extending from an outer circumference thereof to prevent leakage of cleaning water from the air collection port.

The main body may be formed in the shape of a long rod which does not interfere with the flow of air passing through the air collection port.

The main body may include a water leakage prevention protrusion inclined toward the fastening member.

The cleaning water spray unit may include a plurality of first spray nozzles formed at an edge thereof in a protruding fashion to spray cleaning water at a predetermined angle and a plurality of second spray nozzles formed at a middle part thereof and among the respective first spray nozzles to spray cleaning water in a vertical direction.

Each of the first spray nozzles may have a spray hole formed at one side of a protruding portion thereof so as to have a spray angle about a center of the cleaning water spray unit in a circumferential direction.

The first spray nozzles and the second spray nozzles may be formed so as to be symmetric with respect to a longitudinal axis of the cleaning water spray unit.

The main body and the cleaning water spray unit may be coupled to each other by welding between fastening surfaces of the main body and the cleaning water spray unit.

The laundry treating machine may further include a valve unit, wherein the valve unit may include a water supply valve to control the supply of wash water to the tub, a cleaning water valve to control the supply of cleaning water to the filter cleaning unit, and a cooling water valve to control the supply of cooling water to the cooling water supply unit.

The laundry treating machine may further include a rear gasket to seal a rear part of the tub to prevent leakage of water from the tub to a drive motor and to allow movement of the drive motor relative to the tub.

The laundry treating machine may further include a drive motor fastened to a bearing housing and directly connected to a rotary shaft to rotate the rotary shaft.

The laundry treating machine may further include a suspension unit to support the drum, wherein the tub may be supported more rigidly than the drum supported by the suspension unit.

The laundry treating machine may further include a rotary shaft connected to the drum, a bearing housing to rotatably support the rotary shaft, a drive motor to rotate the rotary shaft, and a suspension unit connected to the bearing housing to absorb vibration of the drum.

The tub may be fixedly fastened to a cabinet.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry machine, comprising:
    a tub to receive wash water;
    a drum rotatably provided in the tub;
    an air supply device provided at an upper position of the tub to heat air discharged from the tub and introduce the heated air into the tub and the air supply device includes an air collection port provided through an outer circumference of the tub, a fan located at an upper position of the air collection port to move air, a heating duct to heat the air moved by the fan and an air discharge port to supply the air heated by the heating duct to a front of the tub; and a cooling water supply device to supply cooling water to a rear inner surface of the tub such that the rear inner surface of the tub serves as a condensing surface and the cooling water allows condensed water to be formed at the condensing surface and the cooling water supply device includes a cooling water nozzle fixed to the tub to supply the cooling water to the rear inner surface of the tub, a cooling water line through which the cooling water is supplied to the cooling water nozzle and a cooling water valve to control a supply of the cooling water to the cooling water line, wherein the cooling water supply nozzle is provided at a position opposite the air collection port and at an angle between 20 to 40 degrees with respect to a vertical axis passing through a center of a rotary shaft of the laundry machine, and wherein the cooling water nozzle includes:
- a first end to which the cooling water line is directly connected;
- a second end fixed through the tub and forming a nozzle to spray the cooling water to the rear inner surface of the tub;
- a catch at which the cooling water nozzle is mounted to the tub; and
- a deflection plate provided at the second end to be angled downward toward the rear inner surface of the tub to deflect and spread the cooling water directly on an upper portion of the rear inner surface of the tub, and wherein the rear inner surface of the tub includes a first portion provided around the rotary shaft of the laundry machine, a second portion provided around a circumference of the first portion, and a gasket provided between the first portion and the second portion, the upper portion being provided on the second portion.

2. The laundry machine of claim 1, wherein the cooling water supply device is provided at a rear upper position of the tub to supply the cooling water to cool the rear inner surface of the tub.

3. The laundry machine of claim 1, wherein the cooling water supply device is provided at a position that is spaced from a center of a rear upper side of the tub in a circumferential direction.

4. The laundry machine of claim 1, wherein the cooling water supply device distributes the cooling water to deflect and spread throughout the rear inner surface of the tub.

5. The laundry machine of claim 1, further comprising:
- a lint filter provided in the air collection port to filter foreign matter and lint contained in air passing through the air collection port; and
- a filter cleaner provided between the fan and the lint filter that supplies the cleaning water to the lint filter so as to remove the foreign matter and lint accumulated on the lint filter.

6. The laundry machine of claim 5, further comprising:
- a water supply valve to control a supply of water to the tub; and
- a cleaning water valve to control a supply of the cleaning water to the filter cleaner.

* * * * *